(12) United States Patent
Wang et al.

(10) Patent No.: US 12,254,102 B2
(45) Date of Patent: Mar. 18, 2025

(54) VIRTUAL PRIVACY CREATION SYSTEM

(71) Applicant: Lenovo (Singapore) Pte. Ltd., Singapore (SG)

(72) Inventors: Song Wang, Cary, NC (US); Jian Li, Durham, NC (US); Mengnan Wang, Chapell Hill, NC (US); Zhenyu Yang, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 256 days.

(21) Appl. No.: 17/740,686

(22) Filed: May 10, 2022

(65) Prior Publication Data

US 2023/0367889 A1    Nov. 16, 2023

(51) Int. Cl.
*G06F 21/62*     (2013.01)
*G06F 3/01*      (2006.01)

(52) U.S. Cl.
CPC ............... *G06F 21/62* (2013.01); *G06F 3/013* (2013.01)

(58) Field of Classification Search
CPC .................................. G06F 21/62; G06F 3/013
See application file for complete search history.

(56) References Cited

U.S. PATENT DOCUMENTS

| 8,223,024 | B1 * | 7/2012 | Petrou | H04W 12/33 |
| | | | | 340/573.7 |
| 2018/0107839 | A1 * | 4/2018 | Clement | G06F 3/017 |

* cited by examiner

*Primary Examiner* — Ayoub Alata
(74) *Attorney, Agent, or Firm* — FERENCE & ASSOCIATES LLC

(57) ABSTRACT

One embodiment provides a method, the method including: tracking, using a virtual privacy creation system, a user having an augmented reality device within an environment; detecting, with the virtual privacy creation system, the user is in proximity to another user having a privacy mode enabled, wherein the privacy mode of the another user identifies privacy settings for the another user; and enabling, at the augmented reality device, a privacy view based upon the privacy settings for the another user.

18 Claims, 3 Drawing Sheets

VIRTUAL PRIVACY CREATION SYSTEM

BACKGROUND

Recently offices have begun transitioning from a traditional cubicle office space with designated assigned seating to more open floor plans that do not contain privacy separators. Traditionally, a cubicle would designate a space for an employee, and the walls of the cubicle would provide an employee with the necessary level of privacy needed to work on sensitive information. The new open floor plans implemented by many major companies removes the use of cubicles and assigned seating; thus, lacking privacy that employees once had. An employee working on sensitive information in such an updated environment is much more likely to have the sensitive information compromised with the lack of privacy present within the open floor plan. As technology continues to advance, privacy methods associated with updated technology may be implemented.

BRIEF SUMMARY

In summary, one aspect provides a method, the method including: tracking, using a virtual privacy creation system, a user having an augmented reality device within an environment; detecting, with the virtual privacy creation system, the user is in proximity to another user having a privacy mode enabled, wherein the privacy mode of the another user identifies privacy settings for the another user; and enabling, at the augmented reality device, a privacy view based upon the privacy settings for the another user.

Another aspect provides an information handling device, the information handling device including: track, using a virtual privacy creation system, a user having an augmented reality device within an environment; detect, with the virtual privacy creation system, the user is in proximity to another user having a privacy mode enabled, wherein the privacy mode of the another user identifies privacy settings for another user; and enable, at the augmented reality device, a privacy view based upon the privacy settings for the another user.

A further aspect provides a product, the product including: a computer-readable storage device that stores executable code that, when executed by a processor, causes the product to: track, using a virtual privacy creation system, a user having an augmented reality device within an environment; detect, with the virtual privacy creation system, the user is in proximity to another user having a privacy mode enabled, wherein the privacy mode of the another user identifies privacy settings for the another user; and enable, at the augmented reality device, a privacy view based upon the privacy settings for the another user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
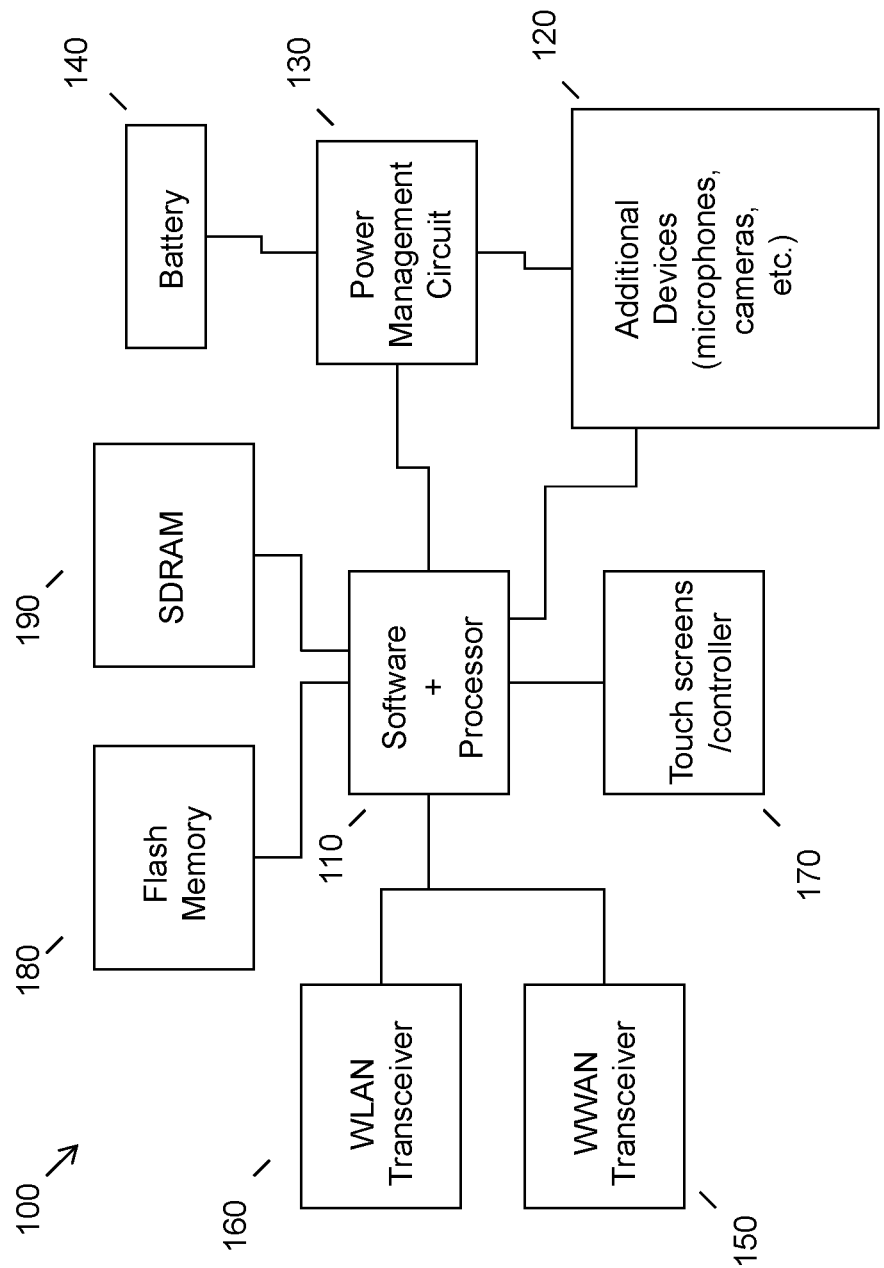
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Transitioning to open floor plans or open office concepts in the work place encounters issues that were not present in an older, more traditional work space. Removing cubicles and other privacy barriers for an open office concept will allow those who are around you to view the information that a user is working on. The ability for those people/co-workers who are present around a user to view the information in which a user is working on is problematic when trying to maintain privacy, and is an even larger issue if a user is working on highly sensitive information not meant for common person viewership.

Conventional solutions to the lack of privacy in an open office concept includes the installing of an additional application and/or plug-in on an information handling device that may detect the presence of another person present within a predetermined distance of the user device displaying private information. Upon the detection of another person entering this predetermined threshold distance, the application minimizes and/or shuts down an application determined to be displaying sensitive information. This method of altering the display of the user based upon the detection of another person within a predetermined distance may work well in an environment with very little to zero additional persons present in a work environment. However, in an open concept office space containing a plurality of users, continuously detecting and altering the display of a user based on the presence of another user may frequently alter the display; thus, negatively influencing a consistency of working and potentially frustrating the user. What is needed is a system that can dynamically alter a display containing sensitive information and maintain privacy without interrupting the user.

Accordingly, the described system and method provides a technique for utilizing a virtual privacy creation system for tracking a user within an environment utilizing an augmented reality device, and detecting when a user may encroach within a predetermined proximity of another user working within a privacy mode. Upon entering within the proximity of the another user within an active privacy mode, the system may enable the privacy mode set by the another user on the display of the user device. Thus, the privacy mode determined by the another user requesting privacy of information being displayed on a device, may dynamically adjust the display present on the user's augmented reality device. In other words, a system may determine the position of each user within a mapped environment by tracking an augmented reality device associated with a user, and adjusting the viewing settings of the user augmented reality device present at a position within a predetermined distance of another user in line with the privacy mode determined by the another user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
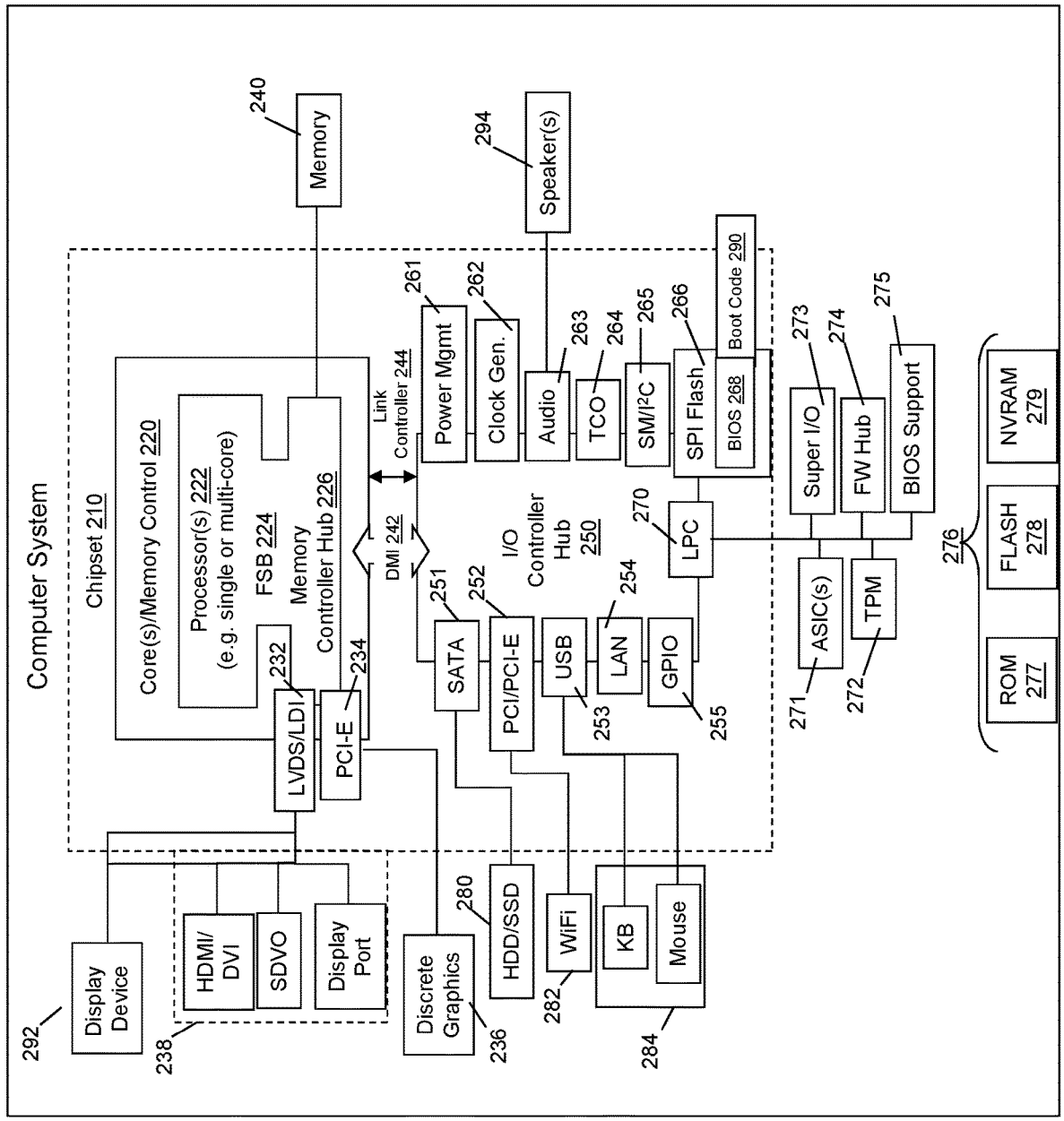
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in augmented reality or other immersive reality devices, systems that implement privacy views, and/or systems that receive privacy settings for users. For example, the circuitry outlined in FIG. 1 may be implemented in a tablet or smart phone embodiment, whereas the circuitry outlined in FIG. 2 may be implemented in a personal computer embodiment.

Figure 3:
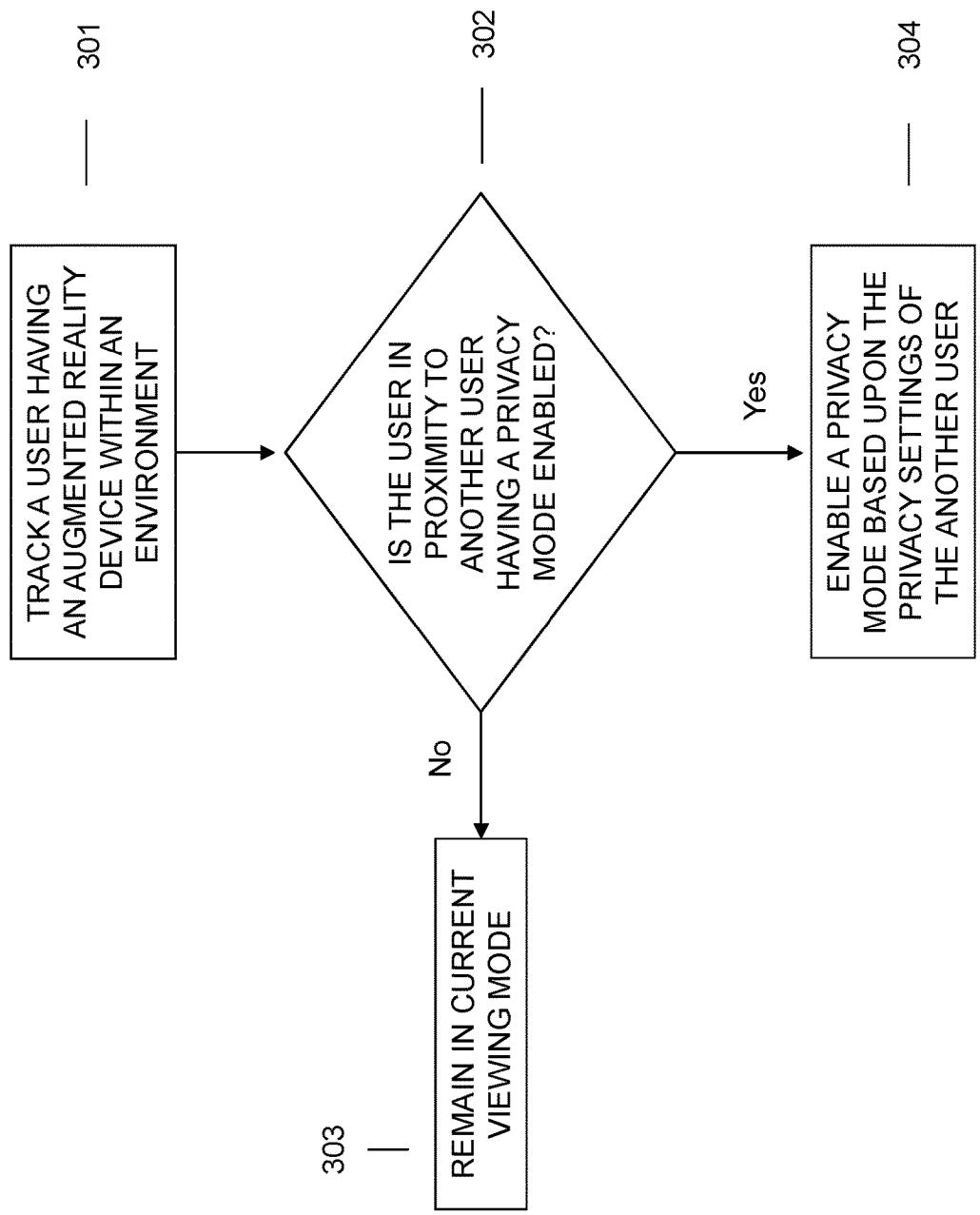
FIG. 3 illustrates an example method of tracking a user in an environment and enabling a privacy mode when the user is determined to be within the proximity of another user.

FIG. 3 illustrates an example method of using a virtual privacy creation system to track an augmented reality device of a user and detect a position of the user within a mapped environment; thereafter, enabling a privacy view on the user augmented reality device restricting a user, within a predetermined proximity, from viewing private information at a device of another user. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to enable a privacy view that reduces the ability of other individuals to see objects a user wants to keep private. Additionally, the virtual privacy creation system includes modules and features that are unique to the described system.

A privacy mode, which may influence the privacy view of the user, is established by another user. The another user may be accessing sensitive information, have information to keep private, or may simply not want others to see the viewable information. The privacy mode may be set by the another user, for example, setting a proximity distance around the another user that when entered by the user will activate a privacy mode and alter the display of the user, thereby obtaining a privacy view. The privacy view on the display of the augmented reality device may be the response the system utilizes upon the detection of the user, also referred to as the viewing user for ease of readability, within the proximity of the another user, also referred to as the working user for ease of readability.

By permitting the working user to dynamically adjust the privacy mode, the system may allow the working user to adjust a privacy mode types based upon their own discretion. Additionally, dynamically adjusting the privacy mode may also include activating a privacy mode under the working user's discretion, too. The privacy mode may be application specific. In other words, a predetermined privacy mode may be associated with an application in use, and when a user decides to access such an application, the privacy mode may become active for any user present within the proximity of the working user as established by the application. The privacy mode may be determined before activating a privacy mode.

Establishing a privacy mode may be sensitivity-level specific. Based upon the information being accessed by the working user, the system may determine, by reference to historical data and/or metadata associated with information being viewed, if the information is considered, for example, highly-sensitive, sensitive, or not sensitive. The use of highly-sensitive, sensitive, and not sensitive is not intended to be limiting, but merely provides an example of sensitivity levels in which the information being accessed by the working user may contain. For example, when it is determined that the information being accessed is deemed highly-sensitive, the privacy mode may be at a peak level, ensuring the highly-sensitive information will not be compromised by onlookers.

As another example, when it is determined that the information being accessed is only sensitive, the privacy mode may be at a middle tier, still altering the privacy view of the user on the augmented reality device. However, the proximity for detection may be smaller, or the user may be permitted to be closer to the working user viewing the sensitive information. In a final example, when it is determined that the information being accessed is deemed to be not sensitive, the system may not active a privacy mode, because excluding of onlookers at the information present on the display of the working user is unnecessary. Once again, the sensitivity levels mentioned previously are not intended to be limiting. As another example, there may be an increased amount of sensitivity levels associated with different privacy modes.

Establishing a privacy mode may also include using a user interface to provide an intention of being in a private area. In other words, the system may query a user, upon the detection of the user in the environment, whether the user intends to utilize a privacy mode or not. For example, if an employee enters a workspace, the augmented reality device may detect when the user stops and sits down, thereafter querying the user regarding if this location is a user's designated workspace. After determining that the user is in their designated workspace, the augmented reality device may then further query the user about potentially utilizing a privacy mode at this designated location. Upon receiving a user selection indicating the user would like to enable a privacy mode, a predetermined privacy mode may be enabled and associated with the designated area. As another example, the augmented reality device may utilize object recognition to determine that the user is in a work setting (e.g., recognition of meeting room numbers, office numbers, etc.) and query the user about enabling a privacy mode.

The privacy mode implemented by the working user and influencing the user augmented reality device display may be dependent on the location of a user within an environment. An augmented reality device may be associated with each user within the environment. In a non-limiting embodiment, the augmented reality device may be a head mounted device (e.g., smart glasses, smart googles, augmented reality helmet, and the like). The use of augmented reality permits the viewing of the physical world around a user through a display that may be overlaid with virtual aspects. When activating a privacy mode, a virtual element may be overlaid on the display of the augmented reality device when the user is determined to be orientated in the direction of a physical display, desk area, whiteboard, and/or the like, of another user in the environment that contains sensitive information. Herein, throughout the description, reference to smart glasses as the augmented reality device may be present, but this is a non-limiting example of a system in use. Additionally, reference to sensitive information on a display will be discussed. However, this is not intended to be limiting as the sensitive information can be located anywhere in a work environment, for example, cabinet, desk, smartboard, white board, and/or the like.

At 301, the system may track a user having an augmented reality device within an environment. The environment in which the user and at least one other is present may be previously mapped. In mapping the environment, the system may be able to accurately determine the position of the user in the environment in relation to other aspects present in the environment. One or more sensors may be employed by the augmented reality device, or other information handling device, to track the user, for example, an accelerometer, gyroscope, image capturing device, proximity sensors, and/or the like. The tracking of the user may be provided to the augmented reality device of the via a network connection. For example, being that an augmented reality device is a smart device, a network connection may be established to actively provide location information of the user back to the system to ascertain the user's location.

Additionally, or alternatively, one or more algorithms may be used to track the user. For example, in an embodiment, global positioning systems (GPS), simultaneous localization and mapping (SLAM) algorithms, distance and triangulation algorithms, and/or the like may be utilized. Distance and triangulation algorithms may include time of flight algorithms, time distance of arrival algorithms, time angle of arrival algorithms, radio signal strength algorithms, and/or the like. These algorithms utilize transmitters and receivers. Transmission signals are transmitted by transmitters of the moving object, for example, a device of the user, the augmented reality device, and/or the like, and received by receivers having a known or calculatable position and location within the environment. The transmission signals may be received at more than one receiver. Utilizing an attribute of the transmission signal (e.g., strength of the received signal, timestamp of the received signal, angle of the received signal, etc.) received at each of the receivers the system can correlate and triangulate the location of the transmitter and, therefore, the user and/or augmented reality device, within the environment. As the user moves, these calculations can continually be performed to identify the new location of the user within the environment.

Tracking the location of the user within the mapped environment may then be utilized to detect if the user is in the proximity to another user having a privacy mode enabled, at 302. As mentioned previously, the proximity distance of the user to another user influencing the potential utilization of a privacy mode may be dynamically selected by the user or may be influenced by a predetermined proximity distance associated with an application in use and/or a sensitivity level of information present on the another user's display. When it is determined that the user is not in proximity to the working user having a privacy mode enabled, at 302, the augmented reality device of the user may remain in the current viewing mode, at 303. Remaining in the current viewing mode at 303 includes viewing the physical world through the augmented reality system without impedance.

However, when the system detects the user is in proximity to another user having a privacy mode enabled, at 302, the augmented reality device of the user may enable a privacy mode based upon the privacy settings of the another user at 304. Since the system knows where the user is in relation to the another user within the environment, for example, a mapped environment, enabling a privacy mode at 304 may include generating virtual privacy screens that may appear on the display of the user augmented reality device as the user moves through an environment and in proximity to another user having a privacy mode enabled. The user may not have to take any active action, rather the action enabling the privacy mode on the augmented reality device may occur automatically as the proximity of the user is determined in relation to the another user.

As a user is moving through an environment with one or more another users having an enabled privacy mode, the system may notify a user that the user is entering an area determined to be within a proximity of another user and further indicating that the user augmented reality device may take action in altering the augmented reality display of the user to fall in line with the privacy mode within the space of the proximity. Additionally, or alternatively, as a user is determined to be moving through an environment and potentially getting closer to private information present within a proximity identified by the another user, the system may simply update a view through the augmented reality device to prevent the user viewing sensitive information being accessed by the another user or otherwise viewable by the user if a privacy view were not engaged.

When altering or dynamically adjusting the augmented reality device of the user upon detection of the user being within proximity of the another user having an enabled privacy mode, the system may obscure the sensitive information on the display. Obscuring the display may include performing an action such as blurring a position on the augmented reality device associated with the sensitive/private information, placing a graphic over the position, and/or the like. Additionally, or alternatively, the actions performed may include darkening a position of the augmented reality device, changing a color of a position of the augmented reality device, and/or the like. The actions performed on the device may alter a specific portion associated with the privacy mode of the another user, permitting the user to view the rest of the physical work around them aside from the location of the sensitive/private information.

Additionally, or alternatively, when determining if the privacy mode established by the another user will influence a user moving through the environment, the augmented reality device may take into account characteristics of the user. For example, when a user is moving through the environment, a speed of the user may be determined, and upon determining that a user is moving quickly, the augmented reality device may determine that the information being viewed by the user would not be legible at the speed the user is moving.

As another example, since the location of a privacy mode is accurately tracked and detected, gaze detection techniques may be utilized to determine a direction in which a user is orientated or looking. The user's gaze detection may be determined to be in line with another user enabling a privacy mode, which would normally activate the privacy actions on the augmented reality device. However, the system may determine that even though the user is orientated in the direction of the another user, the user is too far away from the display of the another user containing sensitive information. Therefore the information is not legible to the user, and the augmented reality device may not alter the display. Gaze detection may be utilized throughout multiple embodiments, because tracking gaze may assist in establishing where a user is viewing and further determine the location of the user augmented reality device that may need to be dynamically adjusted based upon the privacy mode of the another user.

As mentioned previously, a user may dynamically adjust and establish a level of privacy desired when viewing sensitive information. This dynamic adjusting of privacy mode characteristics includes establishing a distance and/or space of privacy which may thereafter establish the proximity from the another user which will influence the augmented reality display of the user. For example, a threshold distance of four feet may be selected by the another user, over the traditional distance of three feet as is assigned to application. Therefore, if a user enters the four-foot distance from the sensitive information, the user's augmented reality device may be adjusted with privacy screens located over the sensitive information.

As another example, the another user may define which objects they desire to make private, for example, blurring out the entirety of the determined proximity including the another user viewing sensitive information, blacking out paperwork and scientific articles that the another user is viewing, blurring any additional devices or displays being utilized by the another user, and/or the like. Any object the another user desires to keep private may be applied within the privacy mode enabled and thereafter influence the display on the user augmented reality device.

As another example, the another user may define a viewing level permitted by the user when entering a proximity of a privacy mode. For example, the viewing level may permit a user to view from a table top downward, thus permitting a user within a proximity to view anything below the table top (e.g., backpack on floor, legs of chairs, etc.) while blurring or altering the scene at the tabletop and above (e.g., the display of the another user device, books and notes present on the table top, the upper half of the another user, etc.). Such a method may permit a user to view a portion of the user in an environment to account for safety while moving through an environment.

As a user within the environment moves closer to and thereafter into a proximity of another user having a privacy mode enabled, the system may enable a level of the privacy view based upon a distance the user is to an object identified in the privacy settings. In other words, as a user gets closer to the private information being viewable within a proximity defined by the privacy settings, the privacy view of the information to be kept private may become more intense as the user gets closer. For example, as mentioned previously, when a user is determined to be a far distance away from the sensitive information a system may determine that the sensitive information is illegible and will not alter the position of the sensitive information on the display at that distance. However, as a user gets closer to the sensitive information, the privacy mode of the augmented reality device may become more intense to ensure that the sensitive information cannot be read. For example, if a user is standing on the threshold of the proximity the privacy view of the sensitive information may be blurred more thoroughly than when further from the proximity. Alternatively, when a user is within the proximity and close to the sensitive information, the privacy view may be enabled at the highest level to negate any viewing of the sensitive information.

Being that the augmented reality device, in this case smart glasses, are worn on the face of each user present in the environment, and each augmented reality device is connected over a network, upon detecting that a user has removed their augmented reality device from their body, or is no longer wearing the device, a notification may be supplied to other users within the environment that a user has removed their wearable device. Removing the wearable device within the environment will negate any privacy mode implementations associated with one or more users viewing sensitive information in the environment. Thus, a user that is present within a proximity of another user having privacy settings set may be alerted immediately that the user has removed their wearable augmented reality device. The another user may then take action to prevent the user from seeing sensitive information, for example, pause working on the sensitive information until the user puts their wearable device back on, alerting security that the user has removed the wearable device, hide the sensitive information, and/or the like.

The various embodiments described herein thus represent a technical improvement to conventional methods for providing privacy to a user within an open spaced environment. Rather than utilizing traditional methods that require the system of the user to be responsive to the detection of one or more persons within a distance from the user device, and pausing or altering a display containing sensitive information, the described system and method utilizes augmented reality devices associated with each user within an environment to enable a privacy mode upon the detection of a user being within a proximity of another user. The system is able to enable a privacy mode established by another user viewing sensitive information on a user augmented reality device, therefore negating the viewing of unauthorized sensitive information by a user while permitting the another user to view the sensitive information without interruption. Additionally, the privacy mode enabling a privacy view may become more intense as a user gets closer to unauthorized sensitive information and may determine that the influence of additional user characteristics may dynamically alter the privacy view of the user. Such embodiments may allow a system to accurately provide privacy to a user viewing sensitive information without interruption by use of one or more augmented reality devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   tracking, using a virtual privacy creation system, a user having an augmented reality device within an environment;
   detecting, with the virtual privacy creation system, the user is in proximity to another user having a privacy mode enabled, wherein the privacy mode of the another user identifies privacy settings for the another user, wherein the detecting comprises determining at least one characteristic of the user moving through the environment while the augmented reality device is being worn by the user; and
   dynamically enabling, at the augmented reality device, a privacy view based upon the privacy settings for the another user, wherein the dynamically enabling comprises accounting for the at least one characteristic of the user and determining a level of the privacy view based upon the at least one characteristic of the user, wherein the level of the privacy view becomes more intense as the user gets closer to the another user;
   wherein the detecting comprises detecting the augmented reality device is removed from a position of wear while the user is in proximity to the another user and notifying the another user of the augmented reality device being removed by the user while present in the environment.

2. The method of claim 1, comprising detecting a gaze of the user is directed in a direction of the another user and wherein the enabling is based upon the detecting a gaze of the user is directed in a direction of the another user.

3. The method of claim 1, wherein the enabling a privacy view comprises enabling a level of the privacy view based upon a distance the user is to an object identified in the privacy settings.

4. The method of claim 1, wherein the privacy settings define a space within the environment as private and wherein the detecting the user is in proximity to the another user comprises detecting the user is within the space.

5. The method of claim 1, wherein the privacy settings define attributes of the another user to enable the privacy mode and wherein the privacy mode is dynamic based upon the attributes of the another user.

6. The method of claim 1, wherein the detecting further comprises determining at least one object the another user has indicated is private via the privacy settings is viewable by the user.

7. The method of claim 1, wherein the privacy settings define objects within the environment as private and wherein the enabling a privacy view comprises obscuring a view of the objects.

8. The method of claim 1, wherein the environment comprises a mapped environment and wherein the tracking is performed using a simultaneous localization and mapping algorithm.

9. The method of claim 1, wherein the enabling a privacy view comprises at least one of: blurring a portion of a view of the augmented reality device, darkening a portion of a view of the augmented reality device, and changing a color of a portion of a view of the augmented reality device.

10. An information handling device, the information handling device comprising:
    a processor;
    a memory device that stores instructions that, when executed by the processor, causes the information handling device to:
    track, using a virtual privacy creation system, a user having an augmented reality device within an environment;
    detect, with the virtual privacy creation system, the user is in proximity to another user having a privacy mode enabled, wherein the privacy mode of the another user identifies privacy settings for another user, wherein the detecting comprises determining at least one characteristic of the user moving through the environment while the augmented reality device is being worn by the user; and
    dynamically enable, at the augmented reality device, a privacy view based upon the privacy settings for the another user, wherein the dynamically enabling comprises accounting for the at least one characteristic of the user and determining a level of the privacy view based upon the at least one characteristic of the user, wherein the level of the privacy view becomes more intense as the user gets closer to the another user;

wherein the detecting comprises detecting the augmented reality device is removed from a position of wear while the user is in proximity to the another user and notifying the another user of the augmented reality device being removed by the user while present in the environment.

11. The information handling device of claim 10, comprising detecting a gaze of the user is directed in a direction of the another user and where in the enabling the is based upon the detecting a gaze of the user is directed in a direction of the another user.

12. The information handling device of claim 10, wherein the enabling a privacy view comprises enabling a level of the privacy view based upon a distance the user is to an object identified in the privacy settings.

13. The information handling device of claim 10, wherein the privacy settings define a space within the environment as private and wherein the detecting the user is in proximity to the another user comprises detecting the user is within the space.

14. The information handling device of claim 10, wherein the privacy settings define attributes of the another user to enable the privacy mode and wherein the privacy mode is dynamic based upon the attributes of the another user.

15. The information handling device of claim 10, wherein the detecting further comprises determining at least one object the another user has indicated is private via the privacy settings is viewable by the user.

16. The information handling device of claim 10, wherein the privacy settings define objects within the environment as private and wherein the enabling a privacy view comprises obscuring a view of the objects.

17. The information handling device of claim 10, wherein the environment comprises a mapped environment and wherein the tracking is performed using a simultaneous localization and mapping algorithm.

18. A product, the product comprising:

a computer-readable storage device that stores executable code that, when executed by a processor, causes the product to:

track, using a virtual privacy creation system, a user having an augmented reality device within an environment;

detect, with the virtual privacy creation system, the user is in proximity to another user having a privacy mode enabled, wherein the privacy mode of the another user identifies privacy settings for the another user, wherein the detecting comprises determining at least one characteristic of the user moving through the environment while the augmented reality device is being worn by the user; and dynamically enable, at the augmented reality device, a privacy view based upon the privacy settings for the another user, wherein the dynamically enabling comprises accounting for the at least one characteristic of the user and determining a level of the privacy view based upon the at least one characteristic of the user, wherein the level of the privacy view becomes more intense as the user gets closer to the another user;

wherein the detecting comprises detecting the augmented reality device is removed from a position of wear while the user is in proximity to the another user and notifying the another user of the augmented reality device being removed by the user while present in the environment.

* * * * *